Oct. 13, 1942.   E. R. BRADFORD   2,298,340
RETARD FOR FOCAL PLANE SHUTTERS
Filed Dec. 3, 1940   2 Sheets-Sheet 1
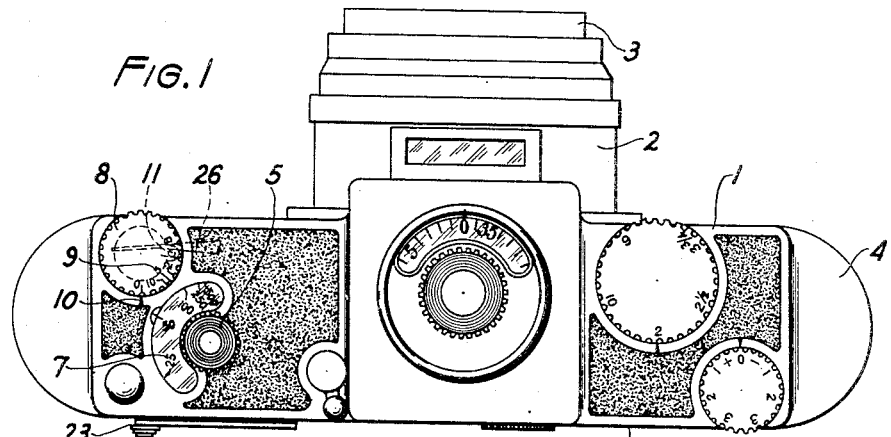
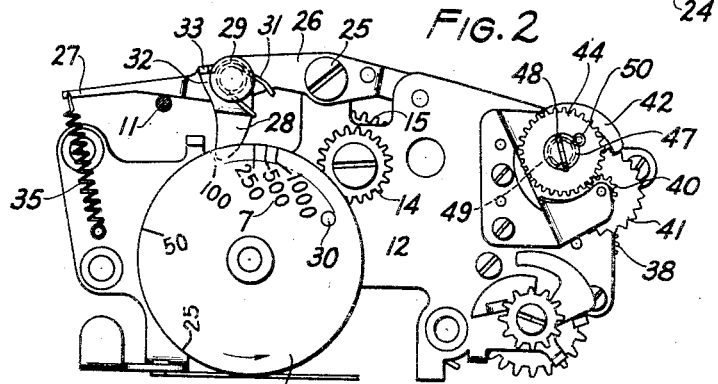
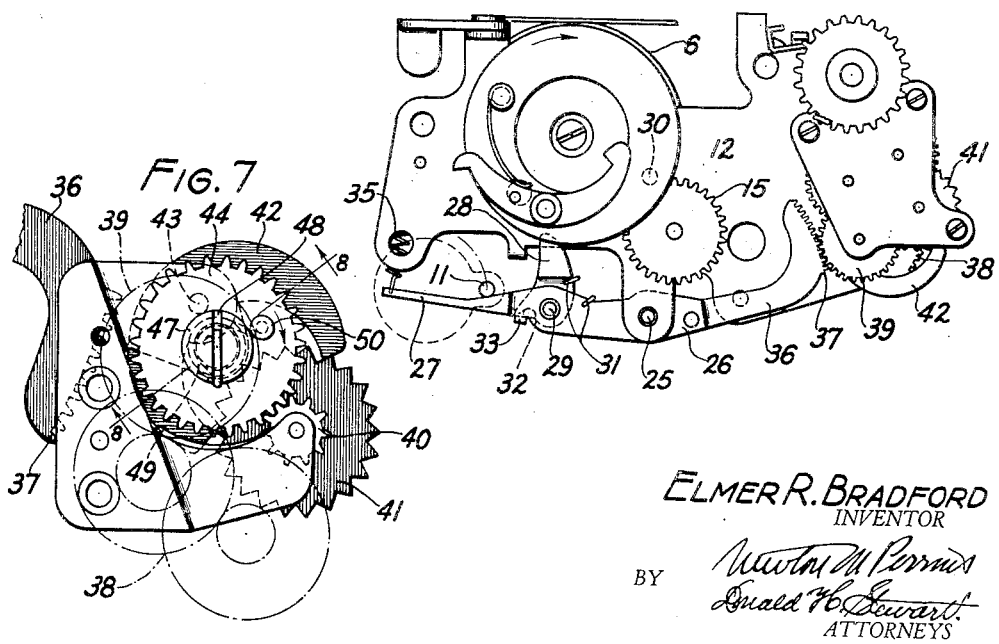
ELMER R. BRADFORD
INVENTOR
BY
ATTORNEYS

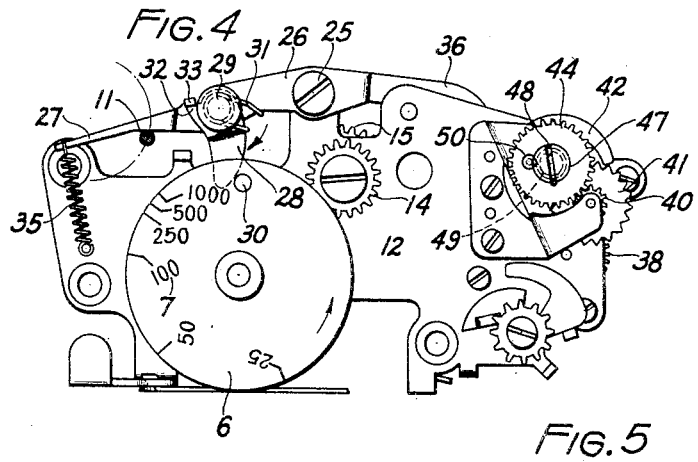
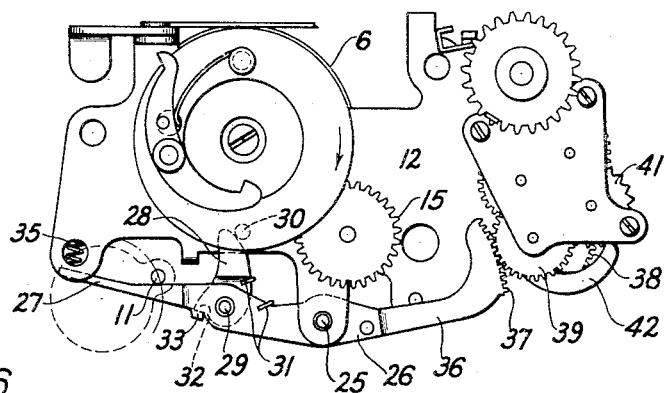
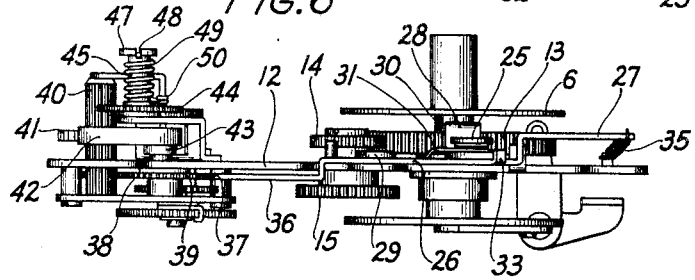
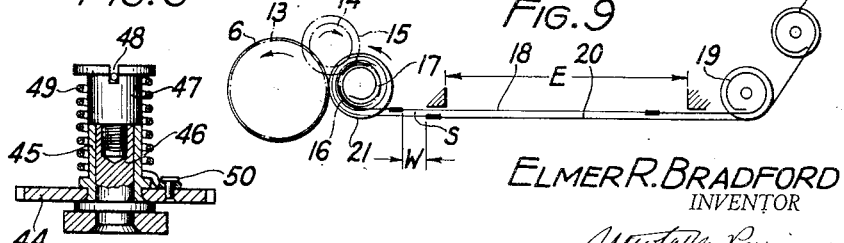

Patented Oct. 13, 1942

2,298,340

UNITED STATES PATENT OFFICE 2,298,340

RETARD FOR FOCAL PLANE SHUTTERS

Elmer R. Bradford, Rochester, N. Y., assignor to Eastman Kodak Company, Rochester, N. Y., a corporation of New Jersey Application December 3, 1940, Serial No. 368,359

7 Claims. (Cl. 95—57)

This invention relates to photography and more particularly to retarding devices for focal plane shutters.

One object of my invention is to provide a retarding device by which repeated exposures of exactly the same speed may be obtained. Another object of my invention is to provide a retarding device for focal plane shutters in which the time of release of a second focal plane shutter curtain can be accurately controlled with respect to the time of release of a first shutter curtain. Still another object of my invention is to provide a retarding mechanism which is comparatively simple and which is susceptible of accurate manufacturing adjustments to control the various delayed action exposures in assembling the camera shutter. Other objects will appear from the following specification, the novel features being particularly pointed out in the claims at the end thereof.

Coming now to the drawings, in which like reference characters denote like parts throughout:

Fig. 1 is a top plan view of a typical camera which may include a focal plane shutter embodying my invention.

Fig. 2 is an enlarged top plan view of a retard for a focal plane shutter mechanism constructed in accordance with and embodying a preferred form of my invention.

Fig. 3 is a bottom plan view of the mechanism shown in Fig. 2.

Fig. 4 is a view similar to Fig. 1, but with the retard mechanism in an operative retarding position.

Fig. 5 is a bottom plan view of the mechanism shown in Fig. 4.

Fig. 6 is a side elevation of the mechanism shown in Fig. 2 and taken from the side of the mechanism towards the top of the sheet in Fig. 2.

Fig. 7 is a top plan view, on an enlarged scale, of a portion of the gear retard.

Fig. 8 is an enlarged fragmentary view, partially in section, of a compensating spring carried by a portion of the gear retard.

Fig. 9 is a diagrammatic showing of a known type of shutter.

Focal plane shutters of the type including two curtains, each having a spring for moving the curtain so that one curtain may move separately from the other are well known. In such focal plane shutters, the duration of the exposure is usually controlled by the time of release of one curtain relative to the other for the slower exposures, although it is customary for the faster exposures to determine the exposure by means of the width of a slot between the ends of the two curtains which may be moving at the same time. For a typical shutter of this type and for a shutter to which my improved gear retard can be readily applied, reference is made to application Serial No. 299,864 for "Focal plane shutter" in the name of Joseph Mihalyi, filed October 17, 1939. In a preferred embodiment of my invention, I apply my retard to a shutter mechanism substantially of the type shown in this application.

As indicated in Fig. 1, the camera may consist of a body 1, having a front extension 2, which carries a suitable objective in a cell 3. On the top wall 4 of the camera, are the shutter speed adjusting mechanisms. The faster speeds—from, say, 1/500 to 1/25 of a second—are controlled by means of a knob 5 which may be used to turn a disk 6, bearing a scale 7 of the faster speeds.

For the slower speeds—say, from 1/10 of a second to one second—a separate setting member, in the form of a disk 8, is provided, this disk carrying a scale 9, the characters of which may be brought opposite to an indexing line 10. This disk carries a depending post 11 which projects downwardly to control the position of the retarding mechanism, as will be hereinafter more fully described.

Referring to Fig. 2, my retarding mechanism may be mounted on a mechanism plate 12 which can be readily attached to the camera 1 with all of the mechanism for retarding the speed of the shutter included on the plate.

The mechanism plate 12 carries the disk 6 described above, which disk may be turned by the knob 5 in a manner which is not important for my invention, since my invention is confined to producing the slow exposures, which are controlled by the disk 8. However, the disk 6 is directly intergeared, as indicated in Fig. 9, through suitable gears 13, 14, 15 and 16 with a drum 17, which carries a curtain 18 which may be wound upon a drum 19. This curtain is the second curtain to move, the first curtain 20 being supported by means of spools 21 coaxially with the gear 16 and drum 17 and being wound on a separate take-up roller 22. In general, the operation of this shutter is well known.

Upon release, the curtain 20 moves until a slot S of the desired width W is made between the two ends of curtains 18 and 20 and this slot passes across the exposure aperture E to make an exposure. The width W of the slot determines the fast exposures, but where the slower automatic exposures are made, the curtain 20 moves first to uncover the exposure aperture E and after the desired lapse of time, the curtain 18 then moves across the exposure aperture to complete the exposure. It is the mechanism for controlling this movement which will now be described.

It is pointed out that the disk 6 moves with the curtain 18 and the gearing is so selected that the disk 6 may move one revolution or 360° at each operation of the shutter, turning in a counter-clockwise direction as the exposure is made and turning in a clockwise direction as the shutter is wound by means of a handle 23 on the camera back 24, this handle being connected in a known manner to the focal plane shutter setting mechanism.

Returning to Fig. 2, the mechanism plate 12 carries a stud 25 on which a rocker arm 26 is pivotally mounted. One end 27 of this rocker arm may move to and from the disk 6, so that a latch element 28, pivotally carried at 29 by the rocker arm, may move into and out of the path of an abutment 30, carried by the disk 6. A spring 31 normally holds the latch 28 in the position shown by a shoulder 32 resting against a lug 33. In this position, the counter-clockwise movement of the abutment 30 will swing the rocker arm 26 about its pivot 25, if the latch element 28 should be in the position shown in Fig. 4, in the path of the pin 30. Thus, the disk 6 would move very slowly while the pin is in contact with the latch element 28, since the rocker arm must be moved out of its Fig. 4 position to such an extent that the pin may pass beneath the latch element 28 before the disk can turn rapidly and permit the curtain 18 to complete the exposure which has previously been started through movement of the front shutter 20. After the pin has passed beyond the latch, the latch will return to a position which will be determined by the movement of the rocker arm 26, and the movement of the rocker arm 26 will be determined by the pin 11 which, as previously described, is a depending pin extending downwardly from the disk 8. Thus, the position of the pin 11 is entirely controlled by the setting of disk 8, and if it has been set for a one-half second exposure, for instance, the arm 26 will always return to a position in which the latch will project into the path of the pin 30 to just such an extent that it will take one-half a second for the disk to pass the latch 28 by swinging the rocker arm 26 outwardly.

Obviously, the rocker arm 26 would swing outwardly rapidly if it were not retarded. This retarding is caused by a number of different things. First, there is a spring 35 which is attached to the end 27 of the rocker arm and to the mechanism plate 12. This spring not only tends to hold the rocker arm in contact with the pin 11, but, in addition, it resists movement of the rocker arm under the impulse of the abutment 30.

In addition, the opposite end 36 of the rocker arm, as best shown in Fig. 3, carries a gear segment 37. This gear segment meshes with one tooth of a gear train, designated broadly as 38 and made up of a plurality of gears, the number of gears being selected to produce the desired amount of retarding. The slowest moving gear is the gear 39 which meshes with the gear segment 37 and the fastest moving gear is the gear 40 which turns with a starwheel 41. A pallet member 42 which may oscillate about its pivot 43 may engage the star wheel 41. This gear train offers sufficient resistance to the rocker arm 26 in its movement about the stud 25 to control its time of operation.

However fine the teeth of the various gears may be, and in spite of the accuracy with which they may be made, it almost always happens that there is a certain amount of play between the gear segment 37 and the fastest moving gear 40. Since a very small amount of play may cause two successive exposures to vary through extremely small limits, it is desirable to cut out this play, and in order to do this, I have provided the following mechanism.

Referring particularly to Figs. 7 and 8, I have provided a gear 44 which meshes with the fastest moving gear 40 of the gear train 38 and which is attached to a sleeve 45, which may rotate about an upstanding post 46, in the top of which there is a stud 47. This stud is slotted at 48 to receive one end of a spring 49, the other end of which is attached at 50 to the gear 44. Thus, as the gear 44 rotates in one direction, it will wind up the spring 49, and when it is permitted to rotate in the other direction, the spring 49 will assist in the unwinding movement. The spring is so coiled about the post 46 that it resists movement of the rocker arm 26 when the abutment 30 strikes the latch element 28 to swing the rocker arm about its pivot 25. It acts therefore in the same direction as the spring 35 and it assists in retarding the movement of the rocker arm. But still more important, the spring 45 always has sufficient tension to take up the play in all of the teeth of the gear train 38, so that each time the rocker arm 26 is moved, it will be retarded to exactly the same extent.

An additional and very useful feature of the spring 49 is that in assembling the shutter for the first time, it provides a factory adjustment for varying the retarding action of the rocker arm 26 so that the exposure may be readily made to exactly coincide with the speed of the setting disk 8. For instance, if this setting disk is set on one-tenth of a second and it is found that actually the shutter gives slightly less than one-tenth of a second, the spring 49 may be adjusted by pulling the end of the spring out of the slot 48 and giving it one-half a turn or more in a direction to wind up the spring. Thus, the retarding action of the rocker arm 26 will be increased to such an extent that the exposure may be delayed until one-tenth of a second is reached. This provides a very simple adjustment and one which can be readily made after the shutter has been assembled.

The reason for the latch 28 being mounted as indicated in Fig. 2, so that it may move in a counter-clockwise direction compressing the spring 31, is that in setting the shutter, the disk 6 is moved in a clockwise direction. Should the setting of the disk 8 be such that the pin 11 is in the position shown in Fig. 4, the abutment 30 would strike the latch element 28, and since the latch element can freely turn in a counter-clockwise direction with respect to this figure, the latch would merely swing without moving the rocker arm 26, permitting the shutter setting movement.

When it is desired to use an exposure which is more rapid than any of the exposures shown on the disk 8 by the scale 9, the disk can be swung to the position shown in Fig. 1, in which the naught is opposite the pointer 10. In this position the pin 11 is moved by the disk 8 to such an extent that the latch element will lie totally beyond and outside of the path of movement of the abutment 30, as indicated in Fig. 2. In this position, the pin may swing back and forth without touching the latch element 28, and consequently, my retarding element will not be used at all. Since my invention relates solely to the retarding element for producing the slower speeds, and since the mechanism for producing the faster speeds is disclosed in the Mihalyi application above referred to, no further description of this mechanism is necessary for an understanding of the present invention.

What I claim is:

1. In a retard for focal plane shutters of the type including two curtains, the first curtain of which may be released in advance of the second curtain to make an exposure between the ends of the curtains, the combination with the second curtain roller, of a disk mounted to move therewith, an abutment carried by the disk, a gear train retard comprising a plurality of gears with intermeshing teeth, a gear segment meshing with one of said gears and including a pivoted rocker arm, a pivoted latch carried by the pivoted arm and movable with the arm and into the path of the abutment carried by the disk, whereby when said disk moves in one direction it may move the rocker arm and when said disk moves in an opposite direction it may turn the latch without moving the rocker arm, a spring tending to turn one gear of the gear train in one direction and adapted to be wound up when the rocker arm is moved in one direction through contact of the disk abutment and the rocker arm latch whereby said spring may take up play between the teeth of the gears of the gear train and may tend to return the rocker arm to a rest position.

2. In a retard for focal plane shutters of the type including two curtains, the first curtain of which may be released in advance of the second curtain to make an exposure between the ends of the curtains, the combination with the second curtain roller, of a disk mounted to move therewith, an abutment carried by the disk, a gear train retard comprising a plurality of gears with intermeshing teeth, a gear segment meshing with one of said gears and including a pivoted rocker arm, a pivoted latch carried by the pivoted arm and movable with the arm and into the path of the abutment carried by the disk, whereby when said disk moves in one direction it may move the rocker arm and when said disk moves in an opposite direction it may turn the latch without moving the rocker arm, a spring tending to turn one gear of the gear train in one direction and adapted to be wound up when the rocker arm is moved in one direction through contact of the disk abutment and the rocker arm latch whereby said spring may take up play between the teeth of the gears of the gear train and may tend to return the rocker arm to a rest position, a speed setting dial, a pin depending therefrom into the path of the rocker arm, whereby the setting of the dial may determine the position of rest of said rocker arm.

3. In a retard for focal plane shutters of the type including two curtains, the first curtain of which may be released in advance of the second curtain to make an exposure between the ends of the curtains, the combination with the second curtain roller, of a disk mounted to move therewith, an abutment carried by the disk, a gear train retard comprising a plurality of gears with intermeshing teeth, a gear segment meshing with one of said gears and including a pivoted rocker arm, a pivoted latch carried by the pivoted arm and movable with the arm and into the path of the abutment carried by the disk, whereby when said disk moves in one direction it may move the rocker arm and when said disk moves in an opposite direction, it may turn the latch without moving the rocker arm, a spring tending to turn one gear of the gear train in one direction and adapted to be wound up when the rocker arm is moved in one direction through contact of the disk abutment and the rocker arm latch whereby said spring may take up play between the teeth of the gears of the gear train and may tend to return the rocker arm to a rest position, a speed setting dial, a pin depending therefrom into the path of the rocker arm for moving the rocker arm to vary the possible contact between the rocker arm and disk abutment to control the duration of the retard, and a spring for moving the rocker arm about its pivot and toward the disk abutment.

4. In a focal plane shutter of the type including two curtains, separate spring drives for each curtain and means for releasing a first curtain before a second curtain to make an exposure between the ends of the two curtains, the combination with a disk operably connected to the second curtain and adapted to make one revolution each time the shutter is actuated, an abutment carried by the disk, a rocker arm pivotally mounted so that one portion of the rocker arm may move to and from said disk, a latch pivotally carried by the rocker arm and movable into and out of the path of the disk abutment whereby the abutment may move the rocker arm in moving in one direction and swing the latch about its pivot without moving the rocker arm in moving in a reverse direction, means for limiting the movement of the rocker arm latch relative to the path of movement of the abutment, and spring means tending to turn the rocker arm towards the abutment, a gear segment carried by the rocker arm, a plurality of intermeshing gears one of which meshes with the gear segment to control the speed of movement of the rocker arm and means to take up the play in all of the intermeshing teeth of the gear train whereby uniform speed characteristics may be obtained for different exposures.

5. In a focal plane shutter of the type including two curtains, separate spring drives for each curtain and means for releasing a first curtain before a second curtain to make an exposure between the ends of the two curtains, the combination with a disk operably connected to the second curtain and adapted to make one revolution each time the shutter is actuated, an abutment carried by the disk, a rocker arm pivotally mounted so that one portion of the rocker arm may move to and from said disk, a latch pivotally carried by the rocker arm and movable into and out of the path of the disk abutment, whereby the abutment may move the rocker arm in moving in one direction and swing the latch about its pivot without moving the rocker arm in moving in a reverse direction, means for limiting the movement of the rocker arm latch relative to the path of movement of the abutment, and spring means tending to turn the rocker arm towards the abutment, a gear segment carried by the rocker arm, a plurality of intermeshing gears one of which meshes with the gear segment to control the speed of movement of the rocker arm, a spring connected to the fastest moving gear of the gear retard tending to oppose movement of the rocker arm by the abutment whereby play in the teeth of the gear train may be taken up, the last-mentioned spring and the spring means for moving the rocker arm both opposing movement of the rocker arm by the disk abutment and assisting said gear train in controlling the speed of movement of the rocker arm.

6. In a focal plane shutter of the type including two curtains, separate spring drives for each curtain and means for releasing a first curtain before a second curtain to make an exposure between the ends of the two curtains, the combination with a disk operably connected to the second curtain and adapted to make one revolution each time the shutter is actuated, an abutment carried by the disk, a rocker arm pivotally mounted so that one portion of the rocker arm may move to and from said disk, a latch pivotally carried by the rocker arm and movable into and out of the path of the disk abutment whereby the abutment may move the rocker arm in moving in one direction and swing the latch about its pivot without moving the rocker arm in moving in a reverse direction, means for limiting the movement of the rocker arm latch relative to the path of movement of the abutment, and spring means tending to turn the rocker arm towards the abutment, a gear segment carried by the rocker arm, a plurality of intermeshing gears one of which meshes with the gear segment to control the speed of movement of the rocker arm, a post, a gear carried by the post meshing with the fastest moving gear of the gear train, a spring attached to said gear meshing with the fastest moving gear and encircling said post, and means for attaching the spring to said post for controlling the tension thereon, the last-mentioned spring and the spring means for moving the rocker arm both opposing movement of the rocker arm by the disk abutment and assisting said gear train in controlling the speed of the rocker arm.

7. In a focal plane shutter of the type including two curtains, separate spring drives for each curtain and means for releasing a first curtain before a second curtain to make an exposure between the ends of the two curtains, the combination with a disk operably connected to the second curtain and adapted to make one revolution each time the shutter is actuated, an abutment carried by the disk, a rocker arm pivotally mounted so that one portion of the rocker arm may move to and from said disk, a latch pivotally carried by the rocker arm and movable into and out of the path of the disk abutment whereby the abutment may move the rocker arm in moving in one direction and swing the latch about its pivot without moving the rocker arm in moving in a reverse direction, means for limiting the movement of the rocker arm latch relative to the path of movement of the abutment, and spring means tending to turn the rocker arm towards the abutment, a gear segment carried by the rocker arm, a plurality of intermeshing gears one of which meshes with the gear segment to control the speed of movement of the rocker arm, a post, a gear carried by the post meshing with the fastest moving gear of the gear train, a spring attached to said gear meshing with the fastest moving gear and encircling said post, the top of said post being slotted, one end of the spring attached to the gear including a bent portion on the other end shaped to be received by the slot in the post, said spring including a plurality of convolutions about the post the tension of which may be altered by adjusting the convolutions by changing the convolutions by the bent end of the spring and its receiving slot, whereby the retarding action of the rocker arm may be adjusted in assembling the shutter.

ELMER R. BRADFORD.